United States Patent Office

3,658,928
Patented Apr. 25, 1972

3,658,928
DEHYDRATION OF α-METHYLBENZYL ALCOHOL
John R. Skinner, Oakland, and Charles E. Sanborn, Walnut Creek, Calif., assignors to Shell Oil Company, New York, N.Y.
No Drawing. Filed Sept. 21, 1970, Ser. No. 74,227
Int. Cl. C07c 15/10
U.S. Cl. 260—669 QZ
7 Claims

ABSTRACT OF THE DISCLOSURE

Styrene is prepared by catalytically dehydrating α-methylbenzyl alcohol in the vapor phase, at a temperature above about 260° C., in the presence of controlled amounts of added steam. In one embodiment, the dehydration is effected in a vertically-oriented catalyst-containing reaction zone, through which the substrate alcohol passes upwardly. Every 75 to 500 hours, the catalyst is reactivated by passing an aromatic hydrocarbon through the reactor zone.

BACKGROUND OF THE INVENTION

Monomeric styrene, the building block for a large variety of co- and homo-polymeric plastics and elastomers, has enjoyed phenomenal success as a chemical of commerce. During the period 1939 to 1967, American production of monomer increased from about 800,000 to about 3.3 billion pounds per year. In 1970, styrene facilities in the United States were capable of producing more than five billion pounds per year, all of which is produced by a single route—the catalytic, vapor-phase, dehydrogenation of ethylbenzene.

During, and for a short period following, World War II, styrene was manufactured by another process: first, oxidizing ethylbenzene to acetophenone in the liquid phase, then hydrogenating the ketone to α-methylbenzyl alcohol (also known as methylphenyl carbinol), and finally, catalytically dehydrating the alcohol to styrene. Information on this process, now apparently abandoned in favor of the dehydrogenation route, is to be found in W. L. Faith et al., Industrial Chemicals, 3rd ed., New York: Wiley, 1965, pp. 736–9; A. L. Ward et al., 'Styrene" in Encyclopedia of Chemical Technology, R. E. Kirk et al., eds., New York: Intersciene, 1954, vol. 13, pp. 132–6; and Boundy et al., Styrene, New York: Reinhold (American Chemical Society), 1952, pp. 44–5.

The reasons for the demise of the dehydration route as a viable industrial process, originally developed to avoid the difficult ethylbenzenestyrene separation required by the dehydrogenation scheme, are unclear. The economics of the process are said to depend on the utilization of intermediates, i.e., acetophenone and methylphenyl carbinol, and byproducts for which only small markets exist (Boundy et al., supra). More importantly, although the conversion per pass and ultimate yield of the dehydration reaction are 80 and 91 percent, respectively, the overall styrene yield of the oxidation-hydrogenation-dehydration scheme is only 78 to 80 percent, as compared to 91 percent by direct dehydrogenation (A. L. Ward et al., supra).

Because of its free-radical character, the oxidation of ethylbenzene is inherently constrained to an ultimate acetophenone yield of about 88 to 90 percent. The hydrogenation reaction yield is nearly quantitative. With little or no improvement possible in the first two steps, it is unfortunate that the literature offers no clue to why the alcohol conversion and corresponding styrene yield are limited to 80 and 91 percent, respectively. Where, in a high temperature, vapor-phase dehydration, approximately 9 percent of the alcohol converted does not appear as the desired product, the conclusion that there is a considerable yield loss to heavy ends offers a reasonable explanation If heavy ends formation does occur during the dehydration, problems related to (1) deposition of the heavy materials on the catalyst and the latter's subsequent deactivation, (2) the duration of active and economical catalyst operation, and (3) the method of regenerating the catalyst, have rarely been alluded to. Indeed, the references cited hereinafter are content in merely disclosing operating temperatures and pressures, catalysts and their methods of preparation, the addition of various components to the carbinol feed, and, perhaps, some conversion and selectivity results.

Thus, an early vapor-phase dehydration of α-methylbenzyl alcohol was disclosed in British Pat. 338,262, wherein an operating temperature of 250° C. was taught. Subsequently, Yamamoto et al. (J. Soc. Chem. Ind. (Japan), 43: Suppl. binding 279–80, 1940) reported a two step process involving, first, the hydrogenation of acetophenone, followed by the dehydration of the resulting carbinol at a temperature of 400° to 500° C., under a vacuum of 10 to 20 mm. Hg. The reaction was carried out in an iron tube filled with granular $Al_2O_3$ or Japanese acid clay. Vansheldt et al. (J. Applied Chem. (U.S.S.R.), 14: 521–3, 1941) produced styrene from α-methylbenzyl alcohol over an alumina catalyst at a temperature of 300° to 400° C. In the course of a 12 hour experiment at 400° C., the styrene yield varied between 94 and 86 percent.

Shriver, U.S. 2,399,395, prepared styrene by dehydrating methylphenyl carbinol in the vapor phase over a titania catalyst, preferably at a temperature between 180° and 280° C. At temperatures between 180° and 220° C. the addition of steam, or the maintenance of a reduced pressure, is said to assist in vaporizing the carbinol. However, in an example of dehydration at 240° C., cessation of the flow of water to the reactor dramatically increased the styrene yield from 65.2 to 85 percent.

Hunter et al., British Pat. 589,015, teach the formation of styrene from α-methylbenzyl alcohol at a temperature between 350° and 400° C., and at a pressure preferably below 100 mm. Hg.

Russell, U.S. 3,403,193, discloses a process for co-producing styrene and a diolefin. The styrene precursor, an alcohol, is dehydrated over crushed sandstone, silica, filter stone, or ceramically bonded, fused $Al_2O_3$. It adds nothing to U.S. 2,399,395 of further pertinence.

Korchak, U.S. 3,442,963, teaches the dehydration of α-methylbenzyl alcohol in the presence of phenol. By the method of preparation disclosed, the alcohol dehydrated inherently contained phenol. Numerous experiments are reported which show, in addition to phenol, the presence of nitrogen and water in the dehydration reactor feed. The influence of these latter two materials on the course of the reaction is not clear. In the absence of phenol and water, an increase in nitrogen concentration resulted in increased styrene selectivity and reduced ethylbenzene and heavy ends make, but at the expense of alcohol conversion. With respect to water, because of varying concentrations of other components, no trends are discernible when this component is added to the feed.

In the prior art, little, if anything, is disclosed about the type and amount, if any, of high molecular weight, tarry polymerization product deposited on the dehydration catalyst. One would expect such deposits, since the product of the dehydration, styrene, readily polymerizes under the dehydration conditions. Catalyst deactivation would readily explain why the reported dehydrations are either of a relatively short duration, i.e., generally less than about 15 hours, or why the time interval of continuous dehydration has not been reported. In fact, it has been found that all types of catalysts for dehydrating methylphenyl carbinol, including alumina, titania, silica, vanadia, and their combinations, undergo such deactivation. On an industrial scale, dehydration with such catalysts would be unsatisfactory, due to considerable yield losses to heavy ends, as well as the virtual impossibility of continuous operation for a sufficiently extended period.

Water, either as a liquid or vapor, is inherently produced in the dehydration of methylphenyl carbinol to styrene. With the exception of U.S. 2,399,395 and U.S. 3,442,963, which disclose the detrimental and inconclusive effects, respectively, of water addition, the literature is generally silent about the benefits, if any, to be gained by controlling the form and concentration of water present during the dehydration.

BRIEF SUMMARY OF THE INVENTION

It has now been found that the difficulties of vapor phase α-methylbenzyl alcohol dehydrations may be avoided, and that styrene can be produced in near quantitative yields, essentially on a continuous basis, by adding certain controlled amounts of steam to the reactor feed, and passing the alcohol-steam mixture through, preferably upward through, a bed of oxide dehydration catalyst at a temperature above about 260° C. Periodically, when needed, the heavy ends-laden oxide dehydration catalyst is reactivated by elution with a liquid aromatic hydrocarbon.

PREFERRED EMBODIMENTS OF THE INVENTION

Where ethylbenzene is the alcohol precursor, the dehydration reaction feed will contain small to moderate quantities of acetophenone. Although U.S. 2,399,395 teaches that acetophenone passes through a titania-catalyzed dehydration substantially unchanged, extended, continuous operation of an α-methylbenzyl alcohol dehydration employing any type of catalyst is difficult, if not impossible, because of catalyst deactivation by the deposition of heavy ends. By the addition of controlled amounts of steam to the alcohol-containing feed, extended operation—for periods of 500 hours or more—is possible. Furthermore, addition of steam permits extended, continuous operation, even when the dehydration reactor feedstock contains 60 percent by weight or more acetophenone.

When about 0.1 to about 4 moles of steam per mole of organic dehydration feed are employed, styrene may be continuously produced for periods as long as 500 hours or more at near quantitative selectivities, while maintaining an alcohol conversion generally above 85 to 90 percent.

In effecting the dehydration, controlled amounts of added steam are injected directly into a vaporized stream of α-methylbenzyl alcohol. The mixture is then fed to and passed through the catalyst. Generally, the contact time of the gases with the catalyst will be on the order of about 0.1 to about 100 seconds.

In effecting the dehydration, a variety of catalysts may be employed. Suitable materials include oxides such as silica, alumina, titania, vanadia, and their mixtures. Commercially available alumina has proven most satisfactory, since this material is relatively inexpensive and the elaborate catalyst preparation techniques described in U.S. 2,399,395 may be avoided.

While in general it is not possible to avoid complete deactivation of the catalyst, the interval between successive reactivations may be substantially lengthened by the manner of contacting the methylphenyl carbinol and steam with the catalyst. The preferred method is to pass the carbinol and steam upward through the catalyst bed. While the better performance of the dehydration in upflow is not entirely understood, it appears that any deactivating contaminants present in the vaporized or formed feed cannot penetrate into the entire catalyst bed as readily as when downflow is employed.

Under no circumstances may the deactivation of the dehydration catalyst be avoided entirely and indefinitely. Generally it will be necessary to reactivate the catalyst when the α-methylbenzyl alcohol conversion drops to an economically unacceptable level—generally about 60 to 80 percent. Generally, such reactivation will be required every 75 to 500 or so hours. The frequency of reactivation will depend upon such variables as the temperature at which the dehydration proceeds, the amount of steam which is added, the quantity of acetophenone in the feed, and the particular dehydration catalyst.

The preferred method of reactivating the dehydration catalyst is to wash the bed with a liquid aromatic hydrocarbon. Suitable solvents include benzene, toluene, the xylenes, ethylbenzene, and their homologues. The preferred solvent is ethylbenzene, since this material will generally be present at the same facility where the α-methylbenzyl alcohol is being prepared. Washing the catalyst with as little as five bed volumes of solvent has been effective in completely regenerating catalyst activity.

Feedstock α-methylbenzyl alcohol may be prepared by a variety of methods. Ethylbenzene is a preferred starting material. In one method, ethylbenzene is oxidized to acetophenone, as taught in U.S. 2,444,816 or U.S. 3,073,867, or a mixture of acetophenone and α-methylbenzyl alcohol, as disclosed in U.S. 2,376,674, and thereafter hydrogenating the ketone by the processes of U.S. 2,544,756 or U.S. 2,575,403. Alternatively, ethylbenzene may be oxidized to ethylbenzene hydroperoxide by the methods of U.S. 2,749,368 or U.S. 2,867,666. The hydroperoxide so produced may be reacted with an olefin in the presence of a heterogeneous catalyst, for instance, in the manner disclosed in copending application Ser. No. 1,847, filed Jan. 9, 1970, to coproduce an olefin epoxide and α-methylbenzyl alcohol.

Preferably the dehydration is carried out on a continuous basis, with reactivation by the above-described methods being effected every 75 to 500 or so hours. When a single dehydration reactor zone is employed, methylphenyl carbinol produced and delivered while the zone is being reactivated may be stored in a suitable surge vessel. Alternatively, when two or more zones are employed, one or more may be in service while others are being regenerated.

EXAMPLES

In the tables which accompany the examples, the following abbreviations are employed: WHSV=Weight Hourly Space Velocity; MPC=Methylphenyl Carbinol, i.e., α-Methylbenzyl Alcohol; MPK=Methylphenyl Ketone, i.e. Acetophenone; and EB=Ethylbenzene.

EXAMPLE I

α-Methylbenzyl alcohol dehydration in the presence of steam

In a series of experiments shown in Table I, the dehydration of α-methylbenzyl alcohol to styrene was conducted in the absence and presence of varying amounts of steam. The catalyst charge, 540 grams of Harshaw A1 0104 commercial alumina catalyst, was placed in a 1.6 inch diameter, stainless steel reaction zone. The zone was maintained at a pressure of about 5 p.s.i.g. and the feed passed upward through the alumina bed at a space velocity of approximately 1.7 hr.$^{-1}$. The α-methylbenzyl alcohol-containing feed was recovered from the effluent of a reactor in which propylene was catalytically epoxidized by ethylbenzene hydroperoxide.

In run 470B, necessary heat for the endothermic reaction was supplied by superheating the steam to 450° C. As later discovered, the combination of steam dilution and surface heating gave equally good results. As little as 0.14 mole of steam per mole of feed was successful in retarding deactivation and lengthening the time period between regenerations. Subsequent operations showed a loss of catalyst activity over several days when 0.2 mole of steam per mole of feed was employed. A considerable portion of this decline in activity was influenced by five hours of operation during which steam addition was inadvertently stopped. Thus, cessation of the flow of added steam for a short period of time, or its complete absence as in the prior art, leads to rapid deactivation of the dehydration catalyst.

At the conclusion of runs 470A and 470D, the catalyst was considered sufficiently deactivated, as measured by the alcohol conversion, to warrant reactivation. Accordingly, 50 to 70 bed volumes of ethylbenzene, at a temperature of about 140° C., was passed through the reactor zone. Such washing was completely effective in restoring the catalyst to its initial activity.

The wash liquid employed in run 470D was subsequently batch vacuum-flashed in a rotary evaporator. An analysis of the residue showed it to contain about 1.8% oxygen, have a carbon to hydrogen ratio of about 1.2, a molecular weight of about 1600, a pyrolysis gas chromatograph, at 585° C. similar to polystyrene, and an ultraviolet spectrogram indicating intense U.V. absorbers, such as fused-ring aromatics.

reactor, the carbinol conversion had dropped only about 2 percentage points in 300 hours of continuous operation.

At the conclusion of each experiment, the catalyst was removed from the reactor zone and examined. In runs 3701 through 3704, the catalyst was found to be completely coated with a black, polymeric material. Alternatively, in the upflow configuration of run 3705, only the first five percent or so of the bed, at the inlet, was similarly coated.

TABLE II.—EFFECT OF FLOW CONFIGURATION ON METHYLPHENYL CARBINOL CONVERSION

| Run | Flow configuration | Feed, wt. percent | | | Dehydration conditions | | | | MPC conversion, percent | |
|---|---|---|---|---|---|---|---|---|---|---|
| | | MPC | MPK | Heavies | Temp., °C. | Press., p.s.i.g. | WHSV, hr.⁻¹ | Steam, hours | Start | End |
| 3701 | Down | 75 | 10–15 | 15–10 | 280–290 | 10 | 1.8 | 160 | >99 | 47 |
| 3702 | do | 75 | 10–15 | 15–10 | 290–300 | 10 | 1.3 | 80 | >99 | <80 |
| 3703 | do | 75 | 10–15 | 15–10 | 275–295 | 10–12 | 1.1 | 80 | >99 | <80 |
| 3704 | do | 50 | 50 | | { 280–320 / 320–350 } | 0–10 | 1.3 | { 140 / 200 } | >99 | 95 / <80 |
| 3705 | Up | 50 | 50 | | 260–300 | 0 | 3.2 | 300 | >99 | 97 |

TABLE I.—α-METHYLBENZYL ALCOHOL DEHYDRATION IN THE PRESENCE OF STEAM

| Run | Hours of continuous operation | | Weight percent MPK in feed | Steam/ feed, mole/ mole | Reactor temperatures, °C. | | Percent | |
|---|---|---|---|---|---|---|---|---|
| | In run | Since reactivation | | | In | Out | MPC conversion | Styrene selectivity |
| 470A | 35 | 35 | 26 | 0 | 289 | 269 | 91.6 | 98.5 |
| | 47 | 47 | 26 | 0 | 296 | 279 | 61.1 | 98.4 |
| | 71 | 71 | 26 | 0 | 302 | 283 | 61.4 | 98.2 |
| | 95 | 95 | 26 | 0 | 299 | 293 | 80.5 | 94.7 |
| 470B | 13 | 13 | 6.5 | 2.5 | 247 | 245 | 18.3 | 98.0 |
| | 60 | 60 | 6.5 | 2.5 | 315 | 281 | 89.8 | |
| | 134 | 134 | 17.7 | 2.5 | 334 | 309 | 96.3 | 99.0 |
| 470C | 14 | 167 | 17.7 | 1.8 | 275 | 290 | 97.1 | 98.1 |
| | 19 | 172 | 17.7 | 0.9 | 274 | 292 | 98.7 | 97.7 |
| | 35 | 192 | 17.7 | 0.45 | 272 | 294 | 98.6 | 97.3 |
| | 58 | 207 | 17.7 | 0.14 | 271 | 292 | 99.3 | 97.8 |
| 470D | 13 | 220 | 17.0 | 0.2 | 275 | 298 | 99.4 | 99.0 |
| | 26 | 233 | 17.0 | 0.2 | 290 | 278 | 95.3 | 98.8 |
| | 30 | 237 | 17.0 | 0.2 | 292 | 283 | 87.8 | 98.5 |
| 470E | 56 | 56 | 17.0 | 1.0 | 260 | 270 | 92.0 | |
| | 73 | 73 | 17.0 | 1.0 | 263 | 273 | 94.1 | 98.2 |
| | 101 | 101 | 17.0 | 1.0 | 265 | 277 | 19.8 | 98.0 |
| | 168 | 168 | 16.0 | 1.0 | 274 | 273 | 84.8 | 97.2 |
| | 216 | 216 | 16.0 | 1.0 | 291 | 284 | 89.8 | 98.1 |
| | 240 | 240 | 16.0 | 1.0 | 297 | 285 | 80.0 | 97.5 |

EXAMPLE II

Effect of flow configuration on methylphenyl carbinol conversion

The manner in which feed is passed through a vertically oriented dehydration reactor profoundly influences the length of time during which conversion of the carbinol may be maintained at near quantitative values. The examples shown in Table II illustrate this phenomenon. In the downflow configuration, i.e., runs 3701 through 3704, feed of the indicated composition was passed downward through a 1.6 inch diameter reactor containing 540 grams of alumina catalyst. Under these conditions, the carbinol conversion dropped to below 80 percent after 80 to about 200 hours of operation. Alternatively, under approximately equivalent dehydration conditions, when a feed was passed upward through approximately 200 grams of a similar alumina catalyst in a 1.6 inch diameter

EXAMPLE III

Extended, continuous dehydration in the presence of steam, with catalyst reactivation Fresh alumina catalyst was charged to the dehydration reactor employed in Example II. Heat was supplied to the reactor by placing it inside an electrically heated furnace. During the course of a 110 hour experiment, the molar steam to feed ratio was approximately 1.0, the space velocity was maintained at about 0.85, and the temperatures were held as low as possible consistent with alcohol conversion. The furnace temperature and resultant alcohol conversion and styrene selectivities during the course of this experiment, run 5701, are shown in Table III.

At the conclusion of this experiment, the catalyst was washed with hot ethylbenzene, in five separate and distinct washes. The reactor zone was pumped full, heated, and held a few degrees below the boiling point of ethylbenzene for one hour, and thereafter drained. The first drain was very dark, the fifth light yellow. The concentration of extracted, tarry material in successive washes appeared to decrease exponentially.

Following reactivation, the dehydration reactor was operated for 546 hours without a similar reactivation. During the first 382 hours of this experiment, run 5702, the average space velocity was approximately 0.95 hr.⁻¹. Approximately 0.5 mole of steam was added per mole of organic feed, at a temperature as low as possible consistent with conversion. Inlet and outlet reactor zone temperatures, alcohol conversions and styrene selectivities are also shown in Table III. The average alcohol conversion was about 88 percent, approximately 250 pounds of alcohol were converted per pound of catalyst, and selectivity to styrene was greater than 95 percent throughout.

TABLE III.—EXTENDED, CONTINUOUS DEHYDRATION IN THE PRESENCE OF STEAM, WITH CATALYST REACTIVATION

| Run | Hours of continuous operation | Reactor temperatures, °C. In | Out | Percent MPC conversion | Styrene selectivity |
|---|---|---|---|---|---|
| 5701 | 6 | ¹260 | | 94.1 | 96.6 |
| | 13 | ¹270 | | | |
| | 30 | 270 | | 92.5 | 95.7 |
| | 35 | ¹280 | | | |
| | 78 | 280 | | 94.6 | 94.0 |
| | 102 | 280 | | 95.5 | 95.3 |
| | 110 | 280 | | 93.5 | 94.8 |
| 5702 | 0 | 262 | 294 | | |
| | 20 | 235 | 262 | 90.0 | 97.5 |
| | 50 | | | 93.8 | 96.5 |
| | 134 | | | 81.6 | 96.7 |
| | 145 | 263 | 280 | | |
| | 157 | | | 88.8 | 97.5 |
| | 193.5 | 265 | 277 | | |
| | 210 | | | 97.2 | 98.5 |
| | 277 | | | 93.4 | 97.2 |
| | 312 | 270 | 289 | | |
| | 317 | | | 87.4 | 95.6 |
| | 340.5 | 267 | 307 | | |
| | 382 | | | 95.2 | 97.9 |

¹ Furnace temperature.

It is well known that metallic oxides, employed in a catalytic reaction which produces heavy ends, may be reactivated by burning off deposited carbonaceous materials with air. In Table IV, the specific surface area, which is a rough measure of catalytic activity, is shown for a number of alumina dehydration catalyst conditions. The superiority of aromatic hydrocarbon extraction of dehydration catalyst, as a regeneration technique, will be evident.

TABLE IV.—SPECIFIC SURFACE AREA OF ALUMINA CATALYST

| Catalyst condition: | Specific surface area, m²/gm. |
|---|---|
| Fresh | 109 |
| Deactivated | ~10 |
| After air burnoff | 104 |
| After ethylbenzene extraction | 113 |

EXAMPLE IV

Production ratios in the dehydration of methylphenyl carbinol

In U.S. 2,399,395, for runs of relatively short duration (3.33 to 11.5 hours), production ratios of 460 to 3440 grams of styrene produced per liter per hour were reported. As shown in Table V, these production ratios are approximately equal to 6.46 and 75.3 pounds of carbinol converted per pound of catalyst, respectively.

TABLE V.—PRODUCTION RATIOS IN U.S. 2,399,395

| Example | 1 | 2 | 3 | 4 |
|---|---|---|---|---|
| Duration of run, hours | 11.5 | 4.5 | 8.0 | 3.33 |
| Styrene yield, percent ¹ | (80.7) | 92.2 | 92.5 | 79.4 |
| Styrene "efficiency" (i.e., selectivity), percent | 94.7 | 92.2 | 90.2 | (²) |
| Carbinol conversion, percent ¹ | 85.2 | (100.0) | (91.5) | (²) |
| Production ratio: | | | | |
| Gms. styrene/liter of catalyst-hour | 460.00 | 574.00 | 3,440.00 | 860.00 |
| Gms. styrene/gm. catalyst ³ | 13.12 | 6.46 | 68.8 | 7.14 |
| Lbs. carbinol converted/lb. catalyst | 15.15 | 6.46 | 75.3 | |

¹ Numbers in parentheses calculated by the formula

Yield=conversion×selectivity

² Not reported.
³ Assumes Al²O₃-TiO₂ catalyst of U.S. 2,399,395 has a density of 4.0 gms./cc.

Table VI reports a series of dehydration reactions wherein the catalyst condition, direction of flow through the reactor zone, amount of acetophenone in the feed, steam to organics ratio, and weight hourly space velocity were varied. Measured and calculated results, including hours of operation at greater than 90 percent carbinol conversion, styrene selectivity and the production ratio, in terms of carbinol converted per pound of catalyst, are also tabulated.

Evaluation of these data indicate that addition of steam essentially doubled the production ratio at a carbinol conversion above 90 percent. When no steam was employed, the highest production ratio was 127 lbs./lb., obtained with a clean feed, i.e., one containing nothing heavier than acetophenone. The average production ratio in the absence of steam was 87 lbs./lb. for a variety of conditions. When steam injection was employed, and the flow configuration was upward through the reaction zone, an average production ratio of 173 lbs./lb. was achieved. The maximum production ratio of 215 lbs./lb. was achieved for 324 hours during run 507.

The much higher production ratios, the greatly increased duration of uninterrupted operation, and the significantly improved styrene selectivity achievable by the process of the present invention, shown in Table VI, are to be compared with the much poorer operating parameters of the prior art, as set out in Table V.

TABLE VI.—PRODUCTION RATIOS IN THE DEHYDRATION OF α-METHYLBENZYL ALCOHOL

| Run | Catalyst condition | Direction of flow | Percent MPK in feed | Steam: organics mol/mol | WHSV, hr.⁻¹ | Hrs. operation >90% MPC conversion | Styrene selectivity, percent | Production ratio, lbs. MPC converted/lb. catalyst |
|---|---|---|---|---|---|---|---|---|
| 110 | Fresh | Down | 16-41 | 0 | 1.6 | 108 | 89-96 | 97 |
| 122 | do | do | 11-16 | 0 | 1.9 | 84 | 94-97 | 92 |
| 228 | Air regen | do | 11-16 | 0 | 2.1 | 59 | 97.5 | 97 |
| 305 | do | do | 11-16 | 0 | 1.6 | 47 | 98.6 | 51 |
| 310 | do | do | ~52 | 0 | 1.3 | 211 | 92-96 | 127 |
| 326 | Fresh | Up | 26 | 0 | 2.2 | 39 | 98.4 | 57 |
| 331 | EB wash | Up | 6-18 | 0.2-2 | 1.7 | 169 | 94-99 | 215 |
| 418 | do | Up | 16-17 | 1.0 | 1.4 | 103 | 97-98 | 113 |
| 507 | do | Up | 16-17 | 1.0 | 1.0 | 324 | 94-98 | 215 |
| 605 | Fresh | Up | 19-22 | 1.0 | 1.4 | 160 | 92-99 | 155 |
| 625 | EB wash | Up | 16-19 | 1.0 | 1.4 | 161 | 97-99 | 168 |

We claim as our invention:

1. In the process of catalytically dehydrating the α-methylbenzyl alcohol in an organic dehydration feed mixture to styrene, in the vapor phase, by contacting in a dehydration zone the α-methylbenzyl alcohol with an oxide dehydration catalyst, the improvement which comprises introducing to said dehydration zone from about 0.1 to about 4 moles of steam per mole of said organic dehydration feed.

2. The process in accordance with claim 1 wherein the temperature maintained within the dehydration zone is between about 270° and about 350° C.

3. The process in accordance with claim 1 wherein the organic dehydration feed mixture and steam enter the lower portion of the catalyst-containing dehydration zone as a vapor and pass upward through said zone.

4. The process in accordance with claim 3 wherein the contact time of the gases with the catalyst within the reaction zone is approximately 0.1 to 100 seconds.

5. The process in accordance with claim 1 wherein the organic dehydration feed mixture contains as much as 60 percent by weight acetophenone.

6. The process in accordance with claim 1 wherein the catalytic dehydration is continuously effected for a period of from about 75 to about 500 hours, after which the oxide dehydration catalyst is regenerated by (a) arresting the flow of organic dehydration feed mixture thereto, and (b) passing therethrough a regeneration agent selected from the group consisting of liquid aromatic hydrocarbons.

7. The process in accordance with claim 6 wherein the liquid aromatic hydrocarbon regeneration agent is ethylbenzene, of which about 4 to about 100 dehydration zone volumes, at a temperature of about 130 to about 160° C., are passed through said oxide dehydration catalyst.

References Cited

UNITED STATES PATENTS

| | | | |
|---|---|---|---|
| 2,399,395 | 4/1946 | Shriver et al. | 260—669 QZ |
| 3,391,198 | 7/1968 | Joris et al. | 260—669 QZ |
| 3,403,193 | 9/1968 | Russell | 260—669 QZ |
| 3,442,963 | 5/1969 | Kovach | 260—669 QZ |

FOREIGN PATENTS

| | | | |
|---|---|---|---|
| 589,015 | 6/1947 | Great Britain | 260—669 QZ |
| 1,186,047 | 1/1965 | Germany | 260—669 QZ |

CURTIS R. DAVIS, Primary Examiner